(12) United States Patent
Wunderlich et al.

(10) Patent No.: US 6,710,146 B2
(45) Date of Patent: Mar. 23, 2004

(54) COMPOSITION AND PROCESS FOR CONTROLLED RADICAL POLYMERIZATION USING MULTIFUNCTIONAL INITIATOR/ REGULATOR COMPOUNDS

(75) Inventors: Wiebke Wunderlich, Bickenbach (DE); Rudolf Pfaendner, Rimbach (DE); Raymond Seltzer, New City, NY (US); James Peter Galbo, Wingdale, NY (US)

(73) Assignee: Ciba Specialty Chemicals Corporation, Tarrytown, NY (US)

( * ) Notice: Subject to any disclaimer, the term of this patent is extended or adjusted under 35 U.S.C. 154(b) by 0 days.

(21) Appl. No.: 10/406,374

(22) Filed: Apr. 3, 2003

(65) Prior Publication Data

US 2003/0212224 A1 Nov. 13, 2003

Related U.S. Application Data

(62) Division of application No. 09/461,927, filed on Dec. 15, 1999, now Pat. No. 6,573,347.
(60) Provisional application No. 60/113,238, filed on Dec. 21, 1998.

(51) Int. Cl.$^7$ .................................................. C08F 4/04
(52) U.S. Cl. .................... 526/218.1; 526/310; 526/319; 526/329.2; 526/335; 526/344; 526/346; 526/348.2; 526/348.5; 526/348.6; 526/348.7; 526/351; 526/352; 526/83; 526/84
(58) Field of Search ............................ 526/218.1, 310, 526/319, 329.2, 335, 344, 346, 348.2, 348.5, 348.6, 348.7, 351, 352, 83, 84

(56) References Cited

U.S. PATENT DOCUMENTS

| | | | |
|---|---|---|---|
| 4,191,683 A | 3/1980 | Brunetti et al. | 260/45.8 |
| 4,581,429 A | 4/1986 | Solomon et al. | 526/220 |
| 4,740,544 A | 4/1988 | Nakahara et al. | 524/100 |
| 5,204,473 A | 4/1993 | Winter et al. | 546/188 |
| 5,728,747 A | 3/1998 | Kazmaier et al. | 522/11 |
| 6,573,347 B1 * | 6/2003 | Wunderlich et al. | 526/218.1 |

FOREIGN PATENT DOCUMENTS

| | | |
|---|---|---|
| EP | 0735052 | 10/1996 |
| EP | 0814097 | 12/1997 |
| EP | 0845448 | 6/1998 |
| EP | 0845448 A1 * | 6/1998 |
| WO | 98/13392 | 4/1998 |

OTHER PUBLICATIONS

Derwent Abstr. 96–515030/51 for JP 08269117.

Billmeyer, Jr., "Textbook on Polymer Science", 3$^{rd}$ Ed., (1984), John Wiley and Sons, Inc., pp. 50–51.

* cited by examiner

Primary Examiner—William Cheung
(74) Attorney, Agent, or Firm—Kevin T. Mansfield

(57) ABSTRACT

The present invention relates to a polymerizable composition comprising a) at least one ethylenically unsaturated monomer and b1) at least one multifunctional triazinyl based 2,2,6,6 tetramethylpiperidine-1-oxyl and a free radical initiator or b2) at least one multifunctional triazinyl based 2,2,6,6 tetramethylpiperidine-1-oxyl-ether. Further aspects of the present invention are a process for polymerizing ethylenically unsaturated monomers, the (co)polymers obtainable by this process and the use of multifunctional triazinyl based 2,2,6,6 tetramethylpiperidine-1-oxyls in combination with a free radical initiator, or a multifunctional triazinyl based 2,2,6,6 tetramethylpiperidine-1-oxyl-ethers for controlled polymerization. In a particularly preferred embodiment at least one additional heating step at a temperature from 140 to 280° C. is applied after polymerization is completed.

19 Claims, No Drawings

COMPOSITION AND PROCESS FOR CONTROLLED RADICAL POLYMERIZATION USING MULTIFUNCTIONAL INITIATOR/REGULATOR COMPOUNDS

This application is a Div of Ser. No. 09/461,927 filed Dec. 15, 1999 now U.S. Pat. No. 6,573,347 and claims benefit of provisional No. 60/113,238 filed Dec. 21, 1998.

The present invention relates to a polymerizable composition comprising a) at least one ethylenically unsaturated monomer and b1) at least one multifunctional triazinyl based 2,2,6,6 tetramethylpiperidine-1-oxyl and a free radical initiator or b2) at least one multifunctional triazinyl based 2,2,6,6 tetramethylpiperidine-1-oxyl-ether. Further aspects of the present invention are a process for polymerizing ethylenically unsaturated monomers, the (co)polymers obtainable by this process and the use of multifunctional triazinyl based 2,2,6,6 tetramethylpiperidine-1-oxyls in combination with a free radical initiator, or a multifunctional triazinyl based 2,2,6,6 tetramethylpiperidine-1-oxyl-ethers for controlled polymerization.

In particular, this invention relates to stable free radical-mediated polymerization processes which provide homopolymers, random copolymers, block copolymers, multi-block copolymers, graft copolymers and the like, at enhanced rates of polymerization and enhanced monomer to polymer conversions.

U.S. Pat. No. 4,581,429 to Solomon et al., issued Apr. 8, 1986, discloses a free radical polymerization process which controls the growth of polymer chains to produce short chain or oligomeric homopolymers and copolymers, including block and graft copolymers. The process employs an initiator having the formula (in part) R'R"N—O—X, where X is a free radical species capable of polymerizing unsaturated monomers. The reactions typically have low conversion rates. Specifically mentioned radical R'R"N—O. groups are derived from 1,1,3,3 tetraethylisoindoline, 1,1,3,3 tetrapropylisoindoline, 2,2,6,6 tetramethylpiperidine, 2,2,5,5 tetramethylpyrrolidine or di-t-butylamine. However, the suggested compounds do not fulfill all requirements. Particularly the polymerization of acrylates does not proceed fast enough and/or the monomer to polymer conversion is not as high as desired.

EP-A-735 052 discloses a method for preparing thermoplastic polymers of narrow poly-dispersities by free radical-initiated polymerization, which comprises adding a free radical initiator and a stable free radical agent to the monomer compound. However the compounds specifically disclosed therein do not fully satisfy the need of high conversion rates, which is a prerequisite for industrial scale up.

JP 08-269117 published Mar. 3, 1995 describes the polymerization of vinyl monomers with nitroxides such as the nitroxides of bis(2,2,6,6-tetramethyl-4-piperidyl) sebaic acid ester and tetrakis(2,2,6,6-tetramethyl-4-piperidyl) 1,2,3,4 butanetetracarboxylate.

It remains however still a problem to achieve a high conversion in short time at a low polydispersity.

The compounds of the present invention provide polymeric resin products having low polydispersity, particularly when the polymer is heated for a certain time after polymerization is completed. In addition the monomer to polymer conversion proceeds in a short time. Thus making the compounds particularly suitable for industrial polymerization processes.

One subject of the invention is a polymerizable composition, comprising a) at least one ethylenically unsaturated monomer or oligomer, and
b) a compound of formula (I)

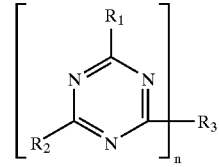

in which n is the number 1 or 2, and $R_1$ is a group of the formula

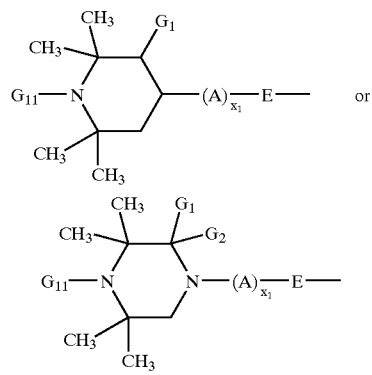

in which
$G_1$ and $G_2$ are hydrogen, methyl or, together, are a substituent =O,
E is —O— or —$ND_3$—,
A is $C_2$–$C_6$alkylene or —$(CH_2)_3$—O— and
$x_1$ is the number 0 or 1,
$D_3$ is hydrogen, $C_1$–$C_{12}$alkyl, $C_2$–$C_5$hydroxyalkyl or $C_5$–$C_7$cycloalkyl,
$R_2$ is identical to $R_1$ or is one of the groups —$N(G_{21})(G_{22})$, —$OG_{23}$, —$N(H)(CH_2OG_{23})$ or —$N(CH_2OG_{23})_2$,
$R_3$, if n=1, is identical to $R_1$ and,
if n=2, is an —E—$D_4$—E— group, in which $D_4$ is $C_2$–$C_8$alkylene or $C_2$–$C_8$alkylene which is interrupted by 1 or 2 —$NG_{21}$— groups,
$G_{21}$ is $C_1$–$C_{12}$alkyl, cyclohexyl, benzyl or $C_1$–$C_4$-hydroxyalkyl or a group of the formula

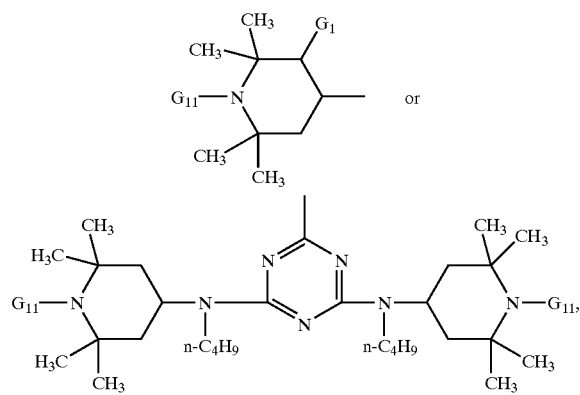

$G_{22}$ is $C_1$–$C_{12}$alkyl, cyclohexyl, benzyl or $C_1$–$C_4$hydroxyalkyl, and $G_{23}$ is hydrogen, $C_1$–$C_{12}$alkyl or phenyl, or $G_{21}$ and $G_{22}$ together are $C_4$–$C_5$alkylene or $C_4$–$C_5$oxaalkylene, for example —CH$_2$CH$_2$—O—CH$_2$CH$_2$—, or a group of the formula —CH$_2$CH$_2$—N(G$_{11}$)—CH$_2$CH$_2$—; and $G_{11}$ is O. or —O—X, wherein
 X represents a group such that the free radical X. derived from X is capable of initiating polymerization of ethylenically unsaturated monomers; and
 if $G_{11}$ is O., a source of free radicals is additionally present.

Some examples of the several variables in the formula (I) are given below.

Any $C_1$–$C_{12}$alkyl substituents are, for example, methyl, ethyl, n-propyl, n-butyl, sec-butyl, tert-butyl, n-hexyl, n-octyl, 2-ethylhexyl, n-nonyl, n-decyl, n-undecyl or n-dodecyl.

Any hydroxyalkyl substituents are, for example, 2-hydroxyethyl, 2-hydroxypropyl, 3-hydroxypropyl, 2-hydroxybutyl or 4-hydroxybutyl.

Any $C_5$–$C_7$cycloalkyl substituents are, for example, cyclopentyl, cyclohexyl or cycloheptyl. Cyclohexyl is preferred.

$C_2$–$C_6$alkylene A is, for example, ethylene, propylene, 2,2-dimethylpropylene, tetramethylene or hexamethylene.

If $G_{21}$, and $G_{22}$ together are $C_4$–$C_5$alkylene or oxaalkylene, they are, for example, tetramethylene, pentamethylene or 3-oxapentamethylene.

Preferably n is 1 in formula (I).

Particularly preferred compounds of formula (I) are, wherein n is 1, $R_1$ and $R_3$ are a group

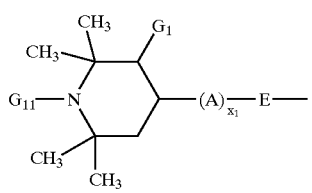

and $R_2$ is identical to $R_1$ and $R_3$ or is a group —N(G$_{21}$)(G$_{22}$) and the other substituents are as defined above.

Most preferred compounds of formula (I) are, wherein n is 1;

$R_1$ and $R_3$ are a group of formula

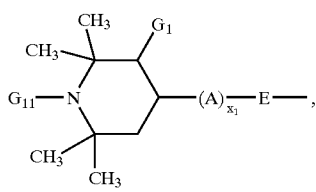

$R_2$ is identical to $R_1$ and $R_3$, or is a group —N(G$_{21}$)(G$_{22}$), wherein $x_1$ is 0; $G_1$ is hydrogen; $G_{11}$ is O.; E is —ND$_3$; $D_3$ is $C_1$–$C_{12}$alkyl and $G_{21}$, and $G_{22}$ are independently $C_1$–$C_{12}$alkyl.

Preferably X is selected from the group consisting of —CH(aryl)$_2$, —CH$_2$-aryl,

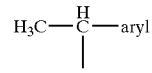

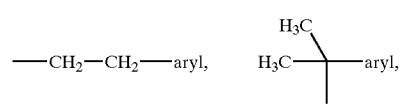

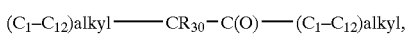

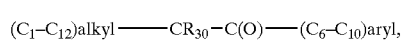

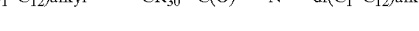

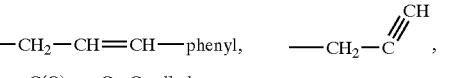

, wherein $R_{30}$ is hydrogen or $C_1$–$C_{12}$alkyl;

the aryl groups are unsubstituted or substituted with $C_1$–$C_{12}$alkyl, halogen, $C_1$–$C_{12}$alkoxy, $C_1$–$C_{12}$alkylcarbonyl, glycidyloxy, OH, —COOH or —COOC$_1$–$C_{12}$alkyl.

Aryl is phenyl or naphthyl.

More preferably X is selected from the group consisting of —CH$_2$-phenyl, CH$_3$CH-phenyl, (CH$_3$)$_2$C-phenyl, (CH$_3$)$_2$CCN, —CH$_2$CH=CH$_2$, and CH$_3$CH—CH=CH$_2$.

Most preferred is a compound of formula (I), wherein $G_{11}$ is —O.

Examples of groups of polyalkylpiperidine compounds according to formula (I) are the compounds of the following formulae:

72)
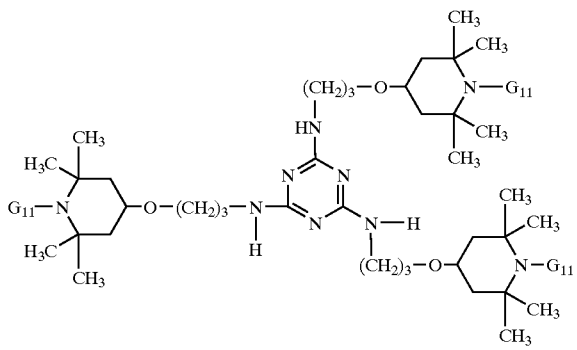

73)
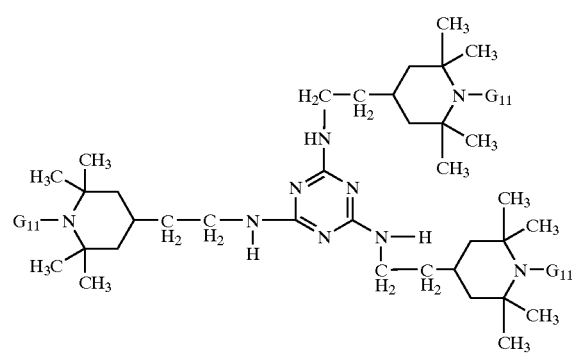

74)
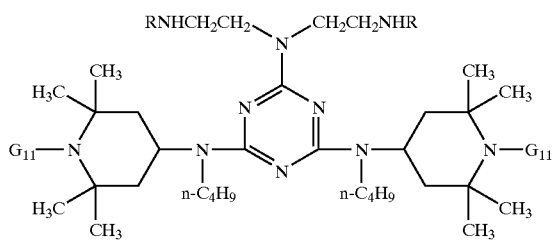

where R is

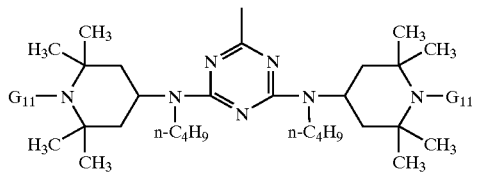

75)
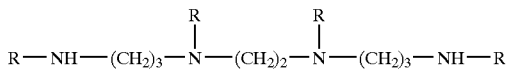

where R has the same meaning as in compound 74.

76)
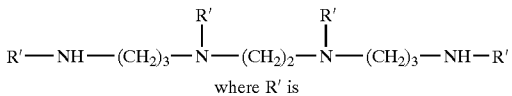

where R' is

-continued
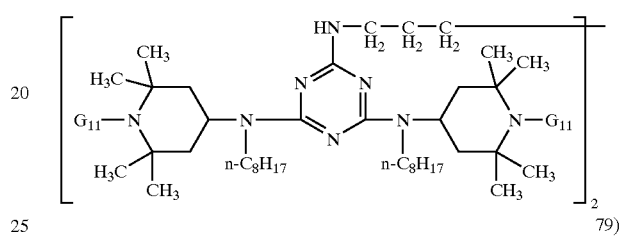

77)

$$R'-N(CH_3)-(CH_2)_3-N(R')-(CH_2)_2-N(R')-(CH_2)_3-N(CH_3)-R'$$

where R' has the same meaning as in compound 76.

78)
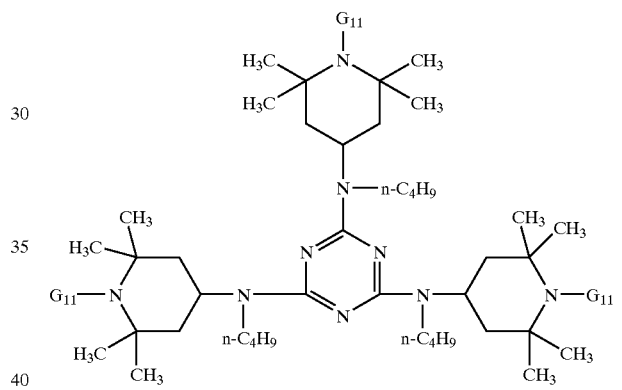

79)

In the above formulae $G_{11}$ represents —O., or —O—X, wherein X is as defined above.

Preferably the compound of formula (I) is present in an amount of from 0.01 mol-% to 30 mol-%, based on the monomer or monomer mixture, more preferably in an amount of from 0.05 mol-% to 20 mol-%, and most preferably in an amount of from 0.1 mol-% to 10 mol-% based on the monomer or monomer mixture.

The compounds according to formula (I) are in principal known and may be prepared according to standard procedures as for example described in U.S. Pat. No. 5,216,156 U.S. Pat. No. 5,004,770 or U.S. Pat. No. 5,204,473.

Preferably the source of a free radical initiator is a bis-azo compound, a peroxide or a hydroperoxide.

More preferably, the source of free radicals is 2,2'-azobisisobutyronitrile, 2,2'-azobis(2-methyl-butyronitrile), 2,2'-azobis(2,4-dimethylvaleronitrile), 2,2'-azobis(4-methoxy-2,4-dimethylvaleronitrile), 1,1'-azobis(1-cyclohexanecarbonitrile), 2,2'-azobis(isobutyramide) dihydrate, 2-phenylazo-2,4-dimethyl-4-methoxy-valeronitrile, dimethy-2,2'-azobisisobutyrate, 2-(carbamoylazo)isobutyronitrile, 2,2'-azobis(2,4,4-trimethylpentane), 2,2'-azobis(2-methylpropane), 2,2'-azobis(N,N'-dimethyleneisobutyramidine), free base or hydrochloride, 2,2'-azobis(2-amidinopropane), free base or hydrochloride, 2,2'-azobis{2-methyl-N-[1,1-bis (hydroxymethyl)ethyl]propionamide} or 2,2'-azobis{2-methyl-N-[1,1-bis(hydroxymethyl)-2-hydroxyethyl]propionamide.

Preferred peroxides and hydroperoxides are acetyl cyclohexane sulphonyl peroxide, diisopropyl peroxy dicarbonate, t-amyl perneodecanoate, t-butyl perneodecanoate, t-butyl perpivalate, t-amylperpivalate, bis(2,4-dichlorobenzoyl) peroxide, diisononanoyl peroxide, didecanoyl peroxide, dioctanoyl peroxide, dilauroyl peroxide, bis (2-methylbenzoyl) peroxide, disuccinic acid peroxide, diacetyl peroxide, dibenzoyl peroxide, t-butyl per 2-ethylhexanoate, bis-(4-chlorobenzoyl)-peroxide, t-butyl perisobutyrate, t-butyl permaleinate, 1,1-bis(t-butylperoxy)3,5,5-trimethylcyclohexane, 1,1-bis(t-butylperoxy)cyclohexane, t-butyl peroxy isopropyl carbonate, t-butyl perisononaoate, 2,5-dimethylhexane 2,5-dibenzoate, t-butyl peracetate, t-amyl perbenzoate, t-butyl perbenzoate, 2,2-bis (t-butylperoxy) butane, 2,2 bis (t-butylperoxy) propane, dicumyl peroxide, 2,5-dimethylhexane-2,5-di-t-butylperoxide, 3-t-butylperoxy 3-phenylphthalide, di-t-amyl peroxide, α, α'-bis(t-butylperoxy isopropyl) benzene, 3,5-bis (t-butylperoxy)3,5-dimethyl 1,2-dioxolane, di-t-butyl peroxide, 2,5-dimethylhexyne-2,5-di-t-butylperoxide, 3,3,6,6,9,9-hexamethyl 1,2,4,5-tetraoxa cyclononane, p-menthane hydroperoxide, pinane hydroperoxide, diisopropylbenzene mono-α-hydroperoxide, cumene hydroperoxide or t-butyl hydroperoxide.

Preferably the radical source, generating the free radical initiator is present in an amount of from 0.01 mol % to 30 mol %.

Preferably when $G_{11}$ is —O. the molar ratio of the free radical source to the compound of formula I is from 1:2 to 20:1, more preferably from 1:1 to 5:1.

Preferably the ethylenically unsaturated monomer or oligomer is selected from the group consisting of alkene, styrene, substituted styrene, conjugated dienes, acrolein, vinyl acetate, (alkyl)acrylic acidanhydrides, (alkyl)acrylic acid salts, (alkyl)acrylic esters or (alkyl)acrylamides.

More preferably the ethylenically unsaturated monomer is ethylene, propylene, n-butylene, i-butylene, isoprene, 1,3-butadiene, α-$C_5$-$C_{18}$alkene, styrene, α-methyl styrene, p-methyl styrene or a compound of formula $CH_2$=$C(R_a)$—(C=Z)—$R_b$, wherein $R_a$ is hydrogen or $C_1$-$C_4$alkyl, $R_b$ is $NH_2$, O(Me), glycidyl, unsubstituted $C_1$-$C_{18}$alkoxy, $C_1$-$C_{18}$alkoxy interrupted by at least one N and/or O atom, or hydroxy-substituted $C_1$-$C_{18}$alkoxy, $C_1$-$C_{18}$alkoxy interrupted by at least one N and/or O atom, unsubstituted $C_1$-$C_{18}$alkylamino, di($C_1$-$C_{18}$alkyl)amino, hydroxy-substituted $C_1$-$C_{18}$alkylamino or hydroxy-substituted di($C_1$-$C_{18}$alkyl)amino, —O—$CH_2$—$CH_2$—$N(CH_3)_2$ or —O—$CH_2$—$CH_2$—$N^+H(CH_3)_2$ $An^-$;

An is a anion of a monovalent organic or inorganic acid;
Me is a monovalent metal atom
Z is oxygen or sulfur.

Particularly preferred are monomers, wherein $R_a$ is hydrogen, $R_b$ is $NH_2$, unsubstituted or with hydroxy substituted $C_1$-$C_4$alkoxy, unsubstituted $C_1$-$C_4$alkylamino, di($C_1$-$C_4$alkyl)amino, hydroxy-substituted $C_1$-$C_4$alkylamino or hydroxy-substituted di($C_1$-$C_4$alkyl) amino; and Z is oxygen.

Most preferably the ethylenically unsaturated monomer is styrene, α-methyl styrene or p-methyl styrene and ethylene.

To increase polymerization rate furthermore, organic sulfonic or organic carboxylic acids (U.S. Pat. No. 5,322,912), sulfonic acid salts (U.S. Pat. No. 5,608,023), acid anhydrides (Malmström, E.; Miller, R. D.; Hawker, C. J. Tetrahedron 1997, 53, 15225–15236) or vinyl monomers containing acid groups (WO 96/18663) can be added to the polymerization process. Furthermore, the polymerization rate can be enhanced by the addition of phosphorous compounds (U.S. Pat. No. 5,610,249), electron accepting compounds (EP 0 773 232), dimethylsulfoxide (U.S. Pat. No. 5,412,012), reducing agents (EP 0 897 930) or metal catalysts and stable free radical complex catalysts (U.S. Pat. No. 5,744,560).

Another subject of the present invention is a process for preparing an oligomer, a cooligomer, a polymer or a copolymer (block or random) by free radical polymerization of at least one ethylenically unsaturated monomer or oligomer, which comprises (co)polymerizing the monomer or monomers/oligomers in the presence of a compound of formula (I) as described above, wherein if $G_1$ is —O—X
a) under reaction conditions capable of effecting scission of the O—X bond to form two free radicals, the radical .X being capable of initiating polymerization; or if $G_{11}$ is O.
b) additionally in the presence of a free radical source, liberating a free radical which is capable of initiating polymerization.

Preferred is a process, wherein the scission of the O—X bond is effected by ultrasonic treatment, heating or exposure to electromagnetic radiation, ranging from γ to microwaves. More preferred is a process, wherein the scission of the O—X bond is effected by heating and takes place at a temperature of between 50° C. and 180° C.

Preferred is a process, wherein the polymerization takes place at a temperature between 50° and 180° C., more preferred at a temperature between 110° and 150° C.

A further subject of the invention is a process for preparing an oligomer, a cooligomer, a polymer or a copolymer (block or random) by free radical polymerization of at least one ethylenically unsaturated monomer or oligomer, which comprises (co)polymerizing the monomer or monomers/oligomers in the presence of a) a compound having at least two

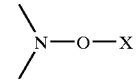

groups, under reaction conditions capable of effecting scission of the O—X bond to form two free radicals, the radicals .X being capable of initiating polymerization and the radicals

being stable free nitroxyl radicals or
b) an initiator/regulator compound having at least two stable free nitroxyl radicals

and additionally a free radical source is present; and
wherein after polymerization is completed at least one additional heating step at a temperature from 140° to 280° C. is applied.

Examples of suitable compounds are those of Formula (I) and the compounds given below.

Nitroxyl-ethers having at least two

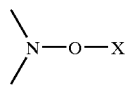

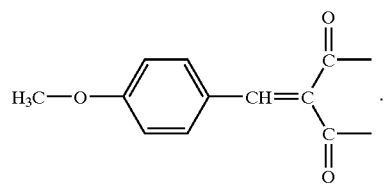

groups and nitroxyl radicals having at least two stable nitroxyl groups

suitable for the above process are for example compounds of the formula (II)

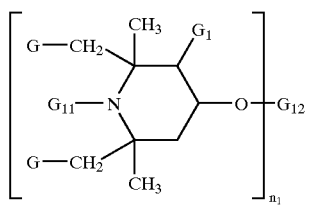

(II)

in which $n_1$ is a number from 2 to 4, G and $G_1$, independently of one another, are hydrogen or methyl, $G_{11}$ is O. or O—X $G_{12}$, if $n_1$ is 2, is $C_2$–$C_{12}$alkylene, $C_4$–$C_{12}$alkenylene, xylylene, a divalent radical of an aliphatic, cycloaliphatic, araliphatic or aromatic dicarboxylic acid, dicarbamic acid or phosphorus-containing acid or a divalent silyl radical, preferably a radical of an aliphatic dicarboxylic acid having 2 to 36 carbon atoms, or a cycloaliphatic or aromatic dicarboxylic acid having 8–14 carbon atoms or of an aliphatic, cycloaliphatic or aromatic dicarbamic acid having 8–14 carbon atoms, where each dicarboxylic acid may be substituted in the aliphatic, cycloaliphatic or aromatic moiety by one or two —$COOZ_{12}$ groups, $G_{12}$, if $n_1$ is 3, is a trivalent radical of an aliphatic, cycloaliphatic or aromatic tricarboxylic acid, which may be substituted in the aliphatic, cycloaliphatic or aromatic moiety by —$COOZ_{12}$, of an aromatic tricarbamic acid or of a phosphorus-containing acid, or is a trivalent silyl radical, and $G_{12}$, if $n_1$ is 4, is a tetravalent radical of an aliphatic, cycloaliphatic or aromatic tetracarboxylic acid.

Alkyl with up to 20 carbon atoms is, for example, methyl, ethyl, n-propyl, n-butyl, sec-butyl, tert-butyl, n-hexyl, n-octyl, 2-ethylhexyl, n-nonyl, n-decyl, n-undecyl, n-dodecyl, n-tridecyl, n-tetradecyl, n-hexadecyl or n-octadecyl.

Examples of several $G_{12}$ radicals are given below.

If $G_{12}$ is a divalent radical of a dicarboxylic acid, it is, for example, a malonyl, succinyl, glutaryl, adipoyl, suberoyl, sebacoyl, maleoyl, itaconyl, phthaloyl, dibutylmalonyl, dibenzylmalonyl, butyl(3,5-di-tert-butyl-4-hydroxybenzyl) malonyl or bicycloheptenedicarbonyl radical or a group of the formula If $G_{12}$ is a trivalent radical of a tricarboxylic acid, it is, for example, a trimellitoyl, citryl or nitrilotriacetyl radical.

If $G_{12}$ is a tetravalent radical of a tetracarboxylic acid, it is, for example, the tetravalent radical of butane-1,2,3,4-tetracarboxylic acid or of pyromellitic acid.

If $G_{12}$ is a divalent radical of a dicarbamic acid, it is, for example, hexamethylenedicarbamoyl or 2,4-toluylenedicarbamoyl radical.

Preference is given to compounds of the formula (II) in which G and $G_1$ are hydrogen, $G_{11}$ O. $n_1$ is 2 and $G_{12}$ is the diacyl radical of an aliphatic dicarboxylic acid having 4–12 carbon atoms.

A typical example is di(1-oxyl-2,2,6,6-tetramethylpiperidin-4-yl) sebacate. These compounds are in principal known and partially commercially available.

Further suitable examples of nitroxyl-ethers and nitroxyl radicals are described in GB 2335190

Preferably the initiator/regulator compound useful in the above process is of formula (I) including the preferences as described above.

The additional heating step may be performed directly in the polymerization apparatus or the polymer may be first isolated cooled down to room temperature stored for a while and then heated again to a temperature between 140° C. and 280° C., more preferably between 140° C. to 200° C. and most preferably between 150° C. to 180° C.

The heating step may be applied from 10 seconds to 2 hours, preferably from 1 minute to 60 minutes and more preferably from 1 minute to 30 minutes.

In a preferred embodiment of the invention the polymer is isolated with conventional techniques. The isolating step of the present process may be carried out by known procedures, e.g. by precipitation, distilling and filtering off unreacted monomer. After completing the reaction the polymer may be filtered off, followed by evaporation of the solvent or by precipitation of the polymer in a suitable liquid phase, filtering the precipitated polymer, washing and drying.

The above described additional heating step is then applied to the dried polymer.

The heating step may be performed in every suitable vessel. It is also possible to heat the polymer in an extruder, mixer or kneading apparatus.

The advantage of the heating step lies in the formation of a more uniform polymer as is proven by the reduced molecular weight distribution after thermal exposure compared to the original material.

During the additional heating step conventional polymer additives such as antioxidants or phosphorous compounds may be added. Examples are given below.

1. Antioxidants 1.1. Alkylated monophenols, for example 2,6-di-tert-butyl-4-methylphenol, 2-tert-butyl-4,6-dimethylphenol, 2,6-di-tert-butyl-4-ethylphenol, 2,6-di-tert-butyl-4-n-butylphenol, 2,6-di-tert-butyl-4-isobutylphenol, 2,6-dicyclopentyl-4-methylphenol, 2-(α-methylcyclohexyl)-4, 6-dimethylphenol, 2,6-dioctadecyl-4-methylphenol, 2,4,6-tricyclohexylphenol, 2,6-di-tert-butyl-4-methoxymethylphenol, nonylphenols which are linear or branched in the side chains, for example, 2,6-di-nonyl-4-methylphenol, 2,4-dimethyl-6-(1'-methylundec-1'-yl)phenol, 2,4-dimethyl-6-(1'-methylheptadec-1'-yl)phenol, 2,4-dimethyl-6-(1'-methyltridec-1'-yl)phenol and mixtures thereof.

1.2. Alkylthiomethylphenols, for example 2,4-dioctylthiomethyl-6-tert-butylphenol, 2,4-dioctylthiomethyl-6-methylphenol, 2,4-dioctylthiomethyl-6-ethylphenol, 2,6-di-dodecylthiomethyl-4-nonylphenol.

1.3. Hydroquinones and alkylated hydroquinones, for example 2,6-di-tert-butyl-4-methoxy-phenol, 2,5-di-tert-butylhydroquinone, 2,5-di-tert-amylhydroquinone, 2,6-diphenyl-4-octade-cyloxyphenol, 2,6-di-tert-butylhydroquinone, 2,5-di-tert-butyl-4-hydroxyanisole, 3,5-di-tert-butyl-4-hydroxyanisole, 3,5-di-tert-butyl-4-hydroxyphenyl stearate, bis-(3,5-di-tert-butyl-4-hydroxyphenyl) adipate.

1.4. Tocopherols, for example α-tocopherol, β-tocopherol, γ-tocopherol, δ-tocopherol and mixtures thereof (Vitamin E).

1.5. Hydroxylated thiodiphenyl ethers, for example 2,2'-thiobis(6-tert-butyl-4-methylphenol), 2,2'-thiobis(4-octylphenol), 4,4'-thiobis(6-tert-butyl-3-methylphenol), 4,4'-thiobis(6-tert-butyl-2-methylphenol), 4,4'-thiobis-(3,6-di-sec-amylphenol), 4,4'-bis(2,6-dimethyl-4-hydroxyphenyl)disulfide.

1.6. Alkylidenebisphenols, for example 2,2'-methylenebis(6-tert-butyl-4-methylphenol), 2,2'-methylenebis(6-tert-butyl-4-ethylphenol), 2,2'-methylenebis[4-methyl-6-(α-methylcyclohexyl)-phenol], 2,2'-methylenebis(4-methyl-6-cyclohexylphenol), 2,2'-methylenebis(6-nonyl-4-methylphenol), 2,2'-methylenebis(4,6-di-tert-butylphenol), 2,2'-ethylidenebis(4,6-di-tert-butylphenol), 2,2'-ethylidenebis(6-tert-butyl-4-isobutylphenol), 2,2'-methylenebis[6-(α-methylbenzyl)-4-nonylphenol], 2,2'-methylenebis[6-(α,α-dimethylbenzyl)-4-nonylphenol], 4,4'-methylenebis(2,6-di-tert-butylphenol), 4,4'-methylenebis(6-tert-butyl-2-methylphenol), 1,1-bis(5-tert-butyl-4-hydroxy-2-methylphenyl)butane, 2,6-bis(3-tert-butyl-5-methyl-2-hydroxybenzyl)-4-methylphenol, 1,1,3-tris(5-tert-butyl-4-hydroxy-2-methylphenyl)butane, 1,1-bis(5-tert-butyl-4-hydroxy-2-methyl-phenyl)-3-n-dodecylmercaptobutane, ethylene glycol bis[3,3-bis(3'-tert-butyl-4'-hydroxyphenyl) butyrate], bis(3-tert-butyl-4-hydroxy-5-methyl-phenyl) dicyclopentadiene, bis[2-(3'-tert-butyl-2'-hydroxy-5'-methylbenzyl)-6-tert-butyl-4-methylphenyl]terephthalate, 1,1-bis-(3,5-dimethyl-2-hydroxyphenyl)butane, 2,2-bis-(3,5-di-tert-butyl-4-hydroxyphenyl)propane, 2,2-bis-(5-tert-butyl-4-hydroxy2-methylphenyl)-4-n-dodecylmercaptobutane, 1,1,5,5-tetra-(5-tert-butyl-4-hydroxy-2-methylphenyl)pentane.

1.7. O-, N- and S-benzyl compounds, for example 3,5,3',5'-tetra-tert-butyl-4,4'-dihydroxydi-benzyl ether, octadecyl-4-hydroxy-3,5-dimethylbenzylmercaptoacetate, tridecyl-4-hydroxy-3,5-di-tert-butylbenzylmercaptoacetate, tris(3,5-di-tert-butyl-4-hydroxybenzyl)amine, bis(4-tert-butyl-3-hydroxy-2,6-dimethylbenzyl)dithioterephthalate, bis(3,5-di-tert-butyl-4-hydroxybenzyl)sulfide, isooctyl-3,5-di-tert-butyl-4-hydroxybenzylmercaptoacetate.

1.8. Hydroxybenzylated malonates, for example dioctadecyl-2,2-bis-(3,5-di-tert-butyl-2-hydroxybenzyl)-malonate, di-octadecyl-2-(3-tert-butyl-4-hydroxy-5-methylbenzyl)-malonate, di-dodecylmercaptoethyl-2,2-bis-(3,5-di-tert-butyl-4-hydroxybenzyl)malonate, bis[4-(1,1,3,3-te-tramethylbutyl)phenyl]-2,2-bis(3,5-di-tert-butyl-4-hydroxybenzyl)malonate.

1.9. Aromatic hydroxybenzyl compounds, for example 1,3,5-tris-(3,5-di-tert-butyl-4-hydroxybenzyl)-2,4,6-trimethylbenzene, 1,4-bis(3,5-di-tert-butyl-4-hydroxybenzyl)-2,3,5,6-tetramethylbenzene, 2,4,6-tris(3,5-di-tert-butyl-4-hydroxybenzyl)phenol.

1.10. Triazine Compounds, for example 2,4-bis (octylmercapto)-6-(3,5-di-tert-butyl-4-hydroxyanilino)-1,3,5-triazine, 2-octylmercapto-4,6-bis(3,5-di-tert-butyl-4-hydroxyanilino)-1,3,5-triazine, 2-octylmercapto-4,6-bis(3,5-di-tert-butyl-4-hydroxyphenoxy)-1,3,5-triazine, 2,4,6-tris (3,5-di-tert-butyl-4-hydroxyphenoxy)-1,2,3-triazine, 1,3,5-tris-(3,5-di-tert-butyl-4-hydroxybenzyl)isocyanurate, 1,3,5-tris(4-tert-butyl-3-hydroxy-2,6-dimethylbenzyl) isocyanurate, 2,4,6-tris(3,5-di-tert-butyl-4-hydroxyphenylethyl)-1,3,5-triazine, 1,3,5-tris(3,5-di-tert-butyl-4-hydroxyphenylpropionyl)-hexahydro-1,3,5-triazine, 1,3,5-tris(3,5-dicyclohexyl-4-hydroxybenzyl)isocyanurate.

1.11. Benzylphosrhonates, for example dimethyl-2,5-di-tert-butyl-4-hydroxybenzylphosphonate, diethyl-3,5-di-tert-butyl-4-hydroxybenzylphosphonate, dioctadecyl-3,5-di-tert-butyl-4-hydroxybenzylphosphonate, dioctadecyl-5-tert-butyl-4-hydroxy-3-methylbenzylphosphonate, the calcium salt of the monoethyl ester of 3,5-di-tert-butyl-4-hydroxybenzylphosphonic acid.

1.12. Acylaminophenols, for example 4-hydroxylauranilide, 4-hydroxystearanilide, octyl N-(3,5-di-tert-butyl-4-hydroxyphenyl)carbamate.

1.13. Esters of β-(3.5-di-tert-butyl-4-hydroxyphenyl) propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'bis(hydroxyethyl) oxamide, 3-thiaundecanol, 3-thiapentadecanol, trimethylhexanediol, trimethylol-propane, 4-hydroxymethyl-1-phospha-2,6,7-trioxabicyclo[2.2.2] octane.

1.14. Esters of β-(5-tert-butyl-4-hydroxy-3-methylphenyl)propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis(hydroxyethyl) oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.15. Esters of β-(3.5-dicyclohexyl-4-hydroxyphenyl) propionic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.16. Esters of 3.5-di-tert-butyl-4-hydroxyphenyl acetic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.17. Amides of β-(3.5-di-tert-butyl-4-hydroxyphenyl) propionic acid e.g. N,N'-bis(3,5-di-tert-butyl-4- hydroxyphenylpropionyl)hexamethylenediamide, N,N'-bis (3,5-di-tert-butyl-4-hydroxyphenylpropionyl) trimethylenediamide, N,N'bis(3,5-di-tert-butyl-4-hydroxyphenylpropionyl)-hydrazide, N,N'bis[2-(3-[3,5-di-tert-butyl-4-hydroxyphenyl]propionyloxy)ethyl]oxamide (Naugard®XL-1 supplied by Uniroyal).

2. Phosphites and phosphonites, for example triphenyl phosphite, diphenyl alkyl phosphites, phenyl dialkyl phosphites, tris(nonylphenyl) phosphite, trilauryl phosphite, trioctadecyl phosphite, distearyl pentaerythritol diphosphite, tris(2,4-di-tert-butylphenyl) phosphite, diisodecyl pentaerythritol diphosphite, bis(2,4-di-tert-butylphenyl) pentaerythritol diphosphite, bis(2,6-di-tert-butyl-4-methylphenyl)-pentaerythritol diphosphite, diisodecyloxypentaerythritol diphosphite, bis(2,4-di-tert-butyl-6-methylphenyl)pentaerythritol diphosphite, bis(2,4,6-tris(tert-butylphenyl)pentaerythritol diphosphite, tristearyl sorbitol triphosphite, tetrakis(2,4-di-tert-butylphenyl) 4,4'-biphenylene diphosphonite, 6-isooctyloxy-2,4,8,10-tetra-tert-butyl-12H-di-benz[d,g]-1,3,2-dioxaphosphocin, 6-fluoro-2,4,8,10-tetra-tert-butyl-12-methyl-dibenz[d,g]-1,3,2-dioxaphosphocin, bis(2,4-di-tert-butyl-6-methylphenyl) methyl phosphite, bis(2,4-di-tert-butyl-6-methylphenyl) ethyl phosphite, 2,2',2"-nitrilo[triethyltris(3,3',5,5'-tetra-tert-butyl-1,1'-biphenyl-2,2'-diyl)phosphite], 2-ethylhexyl(3,3',5,5'-tetra-tert-butyl-1,1'-biphenyl-2,2'-diyl)phosphite.

Especially preferred are the following phosphites:

Tris(2,4-di-tert-butylphenyl) phosphite (Irgafos®168, Ciba-Geigy), tris(nonylphenyl) phosphite,

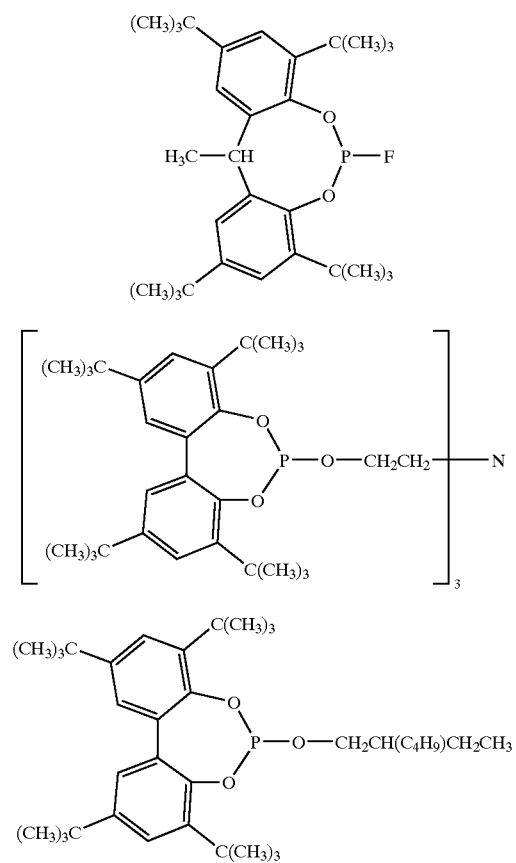

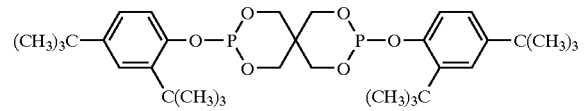

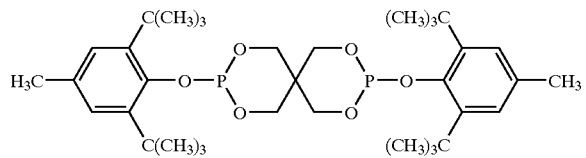

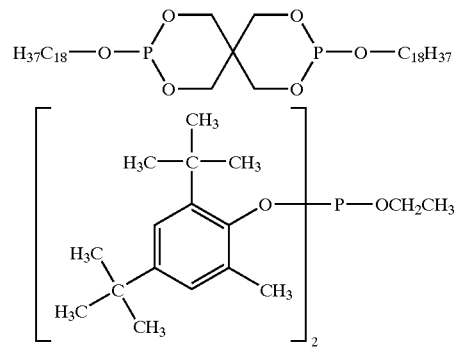

In addition to the initiators/regulators of the present invention there may be other compounds present during polymerization having a monofunctional N—O. moiety.

Suitable compounds are for example described in EP-A-621 878, WO 96/24620, U.S. Pat. No. 4,581,429, U.S. Pat. No. 5,721,320, U.S. Pat. No. 5,627,248, WO 98/13392, WO 98/30601 or in WO 98/44008

Preferred is a compound of formula (X)

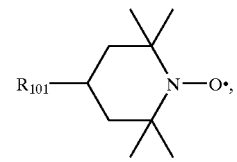

wherein $R_{101}$ is H, —OH, —O—$C_1$-$C_{18}$alkyl, —O—C(O)—$C_1$-$C_{18}$alkyl.

The compounds of formula (X) are preferably present in an amount of from 0.1% to 30% by weight based on the monomer or monomer mixture. They may replace the amount of compounds of formula (I) of from 1% to 50%.

The process may be carried out in the presence of an organic solvent or in the presence of water or in mixtures of organic solvents and water. Additional cosolvents or surfactants, such as glycols or ammonium salts of fatty acids, may be present. Other suitable cosolvents are described hereinafter.

Preferred processes use as little solvents as possible. In the reaction mixture it is preferred to use more than 30% by weight of monomer and initiator, particularly preferably more than 50% and most preferrably more than 80%. In many cases it is possible to polymerize without any solvent.

If organic solvents are used, suitable solvents or mixtures of solvents are typically pure alkanes (hexane, heptane, octane, isooctane), aromatic hydrocarbons (benzene, toluene, xylene), halogenated hydrocarbons (chlorobenzene), ethylene glycol, ethylene glycol monomethyl ether), esters (ethyl acetate, propyl, butyl or hexyl acetate) and ethers (diethyl ether, dibutyl ether, ethylene glycol dimethyl ether), or mixtures thereof.

The aqueous polymerization reactions can be supplemented with a water-miscible or hydrophilic cosolvent to help ensure that the reaction mixture remains a homogeneous single phase throughout the monomer conversion. Any water-soluble or water-miscible cosolvent may be used, as long as the aqueous solvent medium is effective in providing a solvent system which prevents precipitation or phase separation of the reactants or polymer products until after all polymerization reactions have been completed. Exemplary cosolvents useful in the present invention may be selected from the group consisting of aliphatic alcohols, glycols, ethers, glycol ethers, pyrrolidines, N-alkyl pyrrolidinones, N-alkyl pyrrolidones, polyethylene glycols, polypropylene glycols, amides, carboxylic acids and salts thereof, esters, organosulfides, sulfoxides, sulfones, alcohol derivatives, hydroxyether derivatives such as butyl carbitol or cellosolve, amino alcohols, ketones, and the like, as well as derivatives thereof and mixtures thereof. Specific examples include methanol, ethanol, propanol, dioxane, ethylene glycol, propylene glycol, diethylene glycol, glycerol, dipropylene glycol, tetrahydrofuran, and other water-soluble or water-miscible materials, and mixtures thereof. When mixtures of water and water-soluble or water-miscible organic liquids are selected as the aqueous reaction media, the water to cosolvent weight ratio is typically in the range of about 100:0 to about 10:90.

The process is particularly useful for the preparation of block copolymers.

Block copolymers are, for example, block copolymers of polystyrene and polyacrylate (e.g., poly(styrene-co-acrylate) or poly(styrene-co-acrylate-co-styrene). They are useful as adhesives or as compatibilizers for polymer blends or as polymer toughening agents.

Furthermore, block copolymers of this invention, wherein the blocks alternate between polar monomers and non-polar monomers, are useful in many applications as amphiphilic surfactants or dispersants for preparing highly uniform polymer blends.

The (co)polymers of the present invention may have a number average molecular weight from 1 000 to 1000 000 g/mol, preferably from 2 000 to 250 000 g/mol and, more preferably, from 2 000 to 200 000 g/mol. The number average molecular weight may be determined by size exclusion chromatography (SEC), matrix assisted laser desorption/ionization mass spectrometry (MALDI-MS) or, if the initiator carries a group which can be easily distinguished from the monomer(s), by NMR spectroscopy or other conventional methods.

The polymers or copolymers of the present invention have preferably a polydispersity of from 1.1 to 2, more preferably of from 1.2 to 1.8. Particularly when an additional heating step is applied, the polydispersity is preferably between 1.2 and 1.8.

The present invention also encompasses the synthesis of block, multi-block, star, gradient, random, hyperbranched and dendritic copolymers, as well as graft copolymers.

The polymers prepared by the present invention are useful for following applications:

adhesives, detergents, dispersants, emulsifiers, surfactants, defoamers, adhesion promoters, corrosion inhibitors, viscosity improvers, lubricants, rheology modifiers, thickeners, crosslinkers, paper treatment, water treatment, electronic materials, paints, coatings, photography, ink materials, imaging materials, superabsorbants, cosmetics, hair products, preservatives, biocide materials or modifiers for asphalt, leather, textiles, ceramics and wood.

Because the present polymerizaton is a "living" polymerization, it can be started and stopped practically at will. Furthermore, the polymer product retains the functional alkoxyamine group allowing a continuation of the polymerization in a living matter. Thus, in one embodiment of this invention, once the first monomer is consumed in the initial polymerizing step a second monomer can then be added to form a second block on the growing polymer chain in a second polymerization step. Therefore it is possible to carry out additional polymerizations with the same or different monomer(s) to prepare multi-block copolymers.

Furthermore, since this is a radical polymerization, blocks can be prepared in essentially any order. One is not necessarily restricted to preparing block copolymers where the sequential polymerizing steps must flow from the least stabilized polymer intermediate to the most stabilized polymer intermediate, such as is the case in ionic polymerization. Thus it is possible to prepare a multi-block copolymer in which a polyacrylonitrile or a poly(meth)acrylate block is prepared first, then a styrene or diene block is attached thereto, and so on.

A plurality of specifically designed polymers and copolymers are accessible by the present invention, such as star and graft (co)polymers as described, inter alia, by C. J. Hawker in Angew. Chemie, 1995, 107, pages 1623–1627, dendrimers as described by K. Matyaszewski et al. in Macromolecules 1996, Vol 29, No. 12, pages 4167–4171, graft (co) polymers as described by C. J. Hawker et al. in Macromol. Chem. Phys. 198, 155–166(1997), random copolymers as described by C. J. Hawker in Macromolecules 1996, 29, 2686–2688, or diblock and triblock copolymers as described by N. A. Listigovers in Macromolecules 1996, 29, 8992–8993.

A further subject of the invention is a polymer or oligomer having attached at least one oxyamine group of formula (I), obtainable by the above described process.

Still another subject of the invention is the use of a compound of formula (I) for the polymerization of ethylenically unsaturated monomers or oligomers.

The following examples illustrate the invention.

General Polymerization Procedure

In a dry, argon-purged Schlenk tube, the amounts of nitroxyl stable free radical and radical initator given Table 1 are dissolved in 50 ml freshly distilled styrene. The solution is degassed in three consecutive freeze-thaw-cycles and then purged with argon. The stirred mixture/solution is then immersed in an oil bath and polymerized at 130° C. for 6 hours. After polymerization, residual monomer is removed under vacuum at 60° C. and the polymer is dried at 70° C. in vacuo until constant weight is achieved.

Control polymerizations without a stable free radical were carried out identically, at 80° C. Molecular weight and molecular weight distributions are determined by GPC on a HP 1090 liquid chromatograph (software: winGPC/Polymer Standard Services, Mainz, Germany) using THF as eluent and a column combination calibrated with narrow polystyrene standards (Polymer Laboratories).

Dibenzoyl peroxide (BPO) (Merck) was recrystallized from Methanol prior to use. Styrene was distilled under reduced pressure prior to use.

Nitroxyle (1)

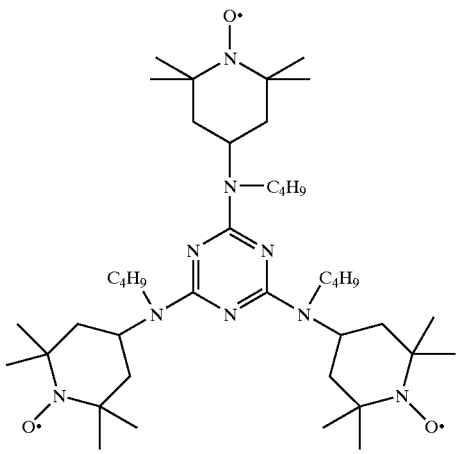

prepared according to U.S. Pat. No. 5,216,156.

BPO is Dibenzoyl peroxide.

TABLE 1

Polymerization of styrene with compound 1, without additional heating step

| Example # | Conversion (%) | Conc. [mol] | $M_n$ | $M_w$ | $M_w/M_n$ |
|---|---|---|---|---|---|
| control | 98 | [BPO] = 6.69 × 10⁻² | 18200 | 49000 | 2.69 |
| 1A | 73 | [BPO] = 6.69 × 10⁻² [101] = 2.9 × 10⁻² | 14400 | 25900 | 1.79 |
| control | 99 | [BPO] = 6.69 × 10⁻³ | 84000 | 180700 | 2.15 |
| 2A | 77 | [BPO] = 6.69 × 10⁻³ [101] = 2.9 × 10⁻³ | 73700 | 133700 | 1.81 |
| 3A | 77 | [BPO] = 6.69 × 10⁻³ [1] = 2.9 × 10⁻ | 70300 | 132100 | 1.88 |

TABLE 2

Polymerization of styrene with mixtures of nitroxide radicals

| Inventive example # | Conversion (%) | Conc [mol/l] | $M_n$ | $M_w$ | $M_w/M_n$ |
|---|---|---|---|---|---|
| 4A | 59 | [BPO] = 6.69 × 10⁻² [1] = 1.45 × 10⁻² [2] = 4.35 × 10⁻² | 10500 | 15200 | 1.45 |
| 5A | 76 | [BPO] = 6.69 × 10⁻³ [1] = 1.45 × 10⁻³ [2] = 4.35 × 10⁻³ | 58500 | 94700 | 1.62 | ratio of radical functionalities provided by each species: NO• (1): NO• (2) = 1:1

(2) is

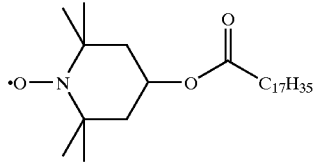

TABLE 3

Polymerization of styrene with a mixture containing 60% tris-nitroxyl and 40% bis-nitroxyl radicals.

| Exp. Nr. | Conc [mol/l] | Conversion (%) | $M_n$ (calc.) | $M_n$ | $M_w$ | $M_w/M_n$ |
|---|---|---|---|---|---|---|
| #7A | [BPO] = 6.69 × 10⁻² [NO•] = 2.9 × 10⁻² | (64) | 7850 | 16100 | 25000 | 1.56 |
| #6A | [BPO] = 6.69 × 10⁻³ [NO•] = 2.9 × 10⁻³ | (77) | 81200 | 78800 | 139900 | 1.77 |

Mixture of

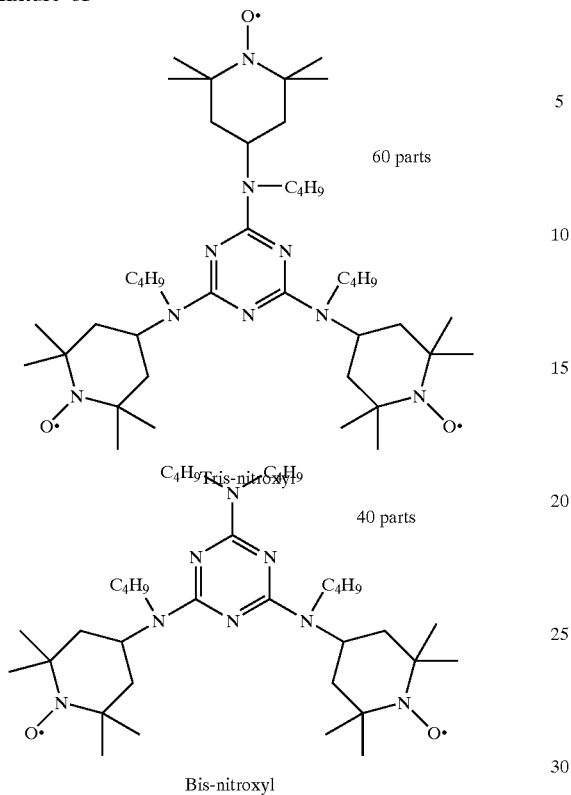

Tris-nitroxyl 60 parts

Bis-nitroxyl 40 parts

TABLE 4

Polymerization with a mixture containing >90% tris nitroxyl and <10% bis nitroxyl radicals.

| Exp. Nr. | Conc [mol/l] | Conversion (%) | $M_n$ (calc.) | $M_n$ | $M_w$ | $M_w/M$ |
|---|---|---|---|---|---|---|
| #8 | [BPO] = $6.69 \times 10^{-2}$<br>[NO•] = $2.9 \times 10^{-2}$ | (58) | 7100 | 14400 | 22100 | 1.54 |
| #9A | [BPO] = $6.69 \times 10^{-3}$<br>[NO•] = $2.9 \times 10^{-3}$ | (84) | 89300 | 74800 | 132800 | 1.77 |

The samples 1A, 2A, 6A and 9A described above were subjected to an additional heating step of different time and temperature and $M_n$ and $M_w$ are measured thereafter.

TABLE 5

Results after applying additional heating steps of 60 min at 200° C. after polymerization

| Example # | $M_n$ original material (A)<br>$M_n$ 1st heat. (B)<br>$M_n$ 2nd heat (C)<br>$M_n$ 1st heat. (D)<br>(Antiox I added) | $M_w$ original material (A)<br>$M_w$ 1st heat.<br>$M_w$ 2nd heat<br>$M_w$ 1st heat.<br>(Antiox I added) | $M_w/M_n$ original material<br>$M_w/M_n$ 1st heat.<br>$M_w/M_n$ 2nd heat<br>$M_w/M_n$ 1st heat. (Antiox I added) |
|---|---|---|---|
| 1A | 14400 | 25900 | 1.79 |
| 1B | 11500 | 14200 | 1.23 |
| 1C | 10700 | 14000 | 1.22 |

TABLE 5-continued

Results after applying additional heating steps of 60 min at 200° C. after polymerization

| Example # | $M_n$ original material (A)<br>$M_n$ 1st heat. (B)<br>$M_n$ 2nd heat (C)<br>$M_n$ 1st heat. (D)<br>(Antiox I added) | $M_w$ original material (A)<br>$M_w$ 1st heat.<br>$M_w$ 2nd heat<br>$M_w$ 1st heat.<br>(Antiox I added) | $M_w/M_n$ original material<br>$M_w/M_n$ 1st heat.<br>$M_w/M_n$ 2nd heat<br>$M_w/M_n$ 1st heat. (Antiox I added) |
|---|---|---|---|
| 1D | 11200 | 13800 | 1.24 |
| 2A | 73700 | 133700 | 1.81 |
| 2B | 54200 | 79200 | 1.54 |
| 2C | 52800 | 79200 | 1.54 |
| 2D | 50600 | 75400 | 1.49 |

Antiox I is Irganox® 1076 supplied by Ciba Specialty Chemicals

TABLE 6

Additional heating step for 60 min at different temperatures

| Example # | $M_n$ original material (A)<br>$M_n$ after heating at<br>180° C./60 min. (E)<br>200° C./60 min. (F)<br>220° C./60 min. (G)<br>240° C./60 min. (H) | $M_w$ (A)<br>$M_w$ (E)<br>$M_w$ (F)<br>$M_w$ (G)<br>$M_w$ (H) | $M_w/M_n$ (A)<br>$M_w/M_n$ (E)<br>$M_w/M_n$ (F)<br>$M_w/M_n$ (G)<br>$M_w/M_n$ (H) |
|---|---|---|---|
| 1A | 14400 | 25900 | 1.79 |
| 1E | 8800 | 13700 | 1.57 |
| 1F | 10400 | 13500 | 1.31 |
| 1G | 10300 | 13500 | 1.31 |
| 1H | 10300 | 13300 | 1.29 |
| 2A | 73700 | 133700 | 1.81 |
| 2E | 51300 | 75700 | 1.48 |
| 2F | 51600 | 74400 | 1.44 |
| 2G | 48200 | 74500 | 1.54 |
| 2H | 47100 | 72600 | 1.54 |

TABLE 7

Additional heating step of 60 min at different temperatures

| Example # | $M_n$ original material (A)<br>$M_n$ after heating at<br>160° C./60 min. (B)<br>200° C./60 min. (C)<br>240° C./60 min. (D) | $M_w$ (A)<br>$M_w$ (B)<br>$M_w$ (C)<br>$M_w$ (D) | $M_w/M_n$ (A)<br>$M_w/M_n$ (B)<br>$M_w/M_n$ (C)<br>$M_w/M_n$ (D) |
|---|---|---|---|
| 6 A | 78800 | 139000 | 1.77 |
| 6 B | 64900 | 105600 | 1.63 |
| 6 C | 62700 | 103400 | 1.64 |
| 6 D | 57700 | 87000 | 1.51 |

TABLE 8

Additional heating step of 15 min at different temperatures

| Example # | $M_n$ original material (A)<br>$M_n$ after heating at<br>160° C./15 min. (E)<br>200° C./15 min. (F)<br>240° C./15 min. (G) | $M_w$ (A)<br>$M_w$ (E)<br>$M_w$ (F)<br>$M_w$ (G) | $M_w/M_n$ (A)<br>$M_w/M_n$ (E)<br>$M_w/M_n$ (F)<br>$M_w/M_n$ (G) |
|---|---|---|---|
| 6 A | 78800 | 139000 | 1.77 |
| 6 B | 73400 | 127700 | 1.74 |
| 6 C | 61100 | 106300 | 1.74 |
| 6 D | 58900 | 96300 | 1.64 |

TABLE 9

Additional heating step for 5 min at different temperatures

| Example # | $M_n$ original material (A)<br>$M_n$ after heating at<br>140° C./5 min. (B)<br>200° C./5 min. (C)<br>220° C./5 min. (D)<br>240° C./5 min. (E) | $M_w$ (A)<br>$M_w$ (B)<br>$M_w$ (C)<br>$M_w$ (D)<br>$M_w$ (E) | $M_w/M_n$ (A)<br>$M_w/M_n$ (B)<br>$M_w/M_n$ (C)<br>$M_w/M_n$ (D)<br>$M_w/M_n$ (E) |
|---|---|---|---|
| 9 A | 74800 | 132800 | 1.77 |
| 9 B | 73900 | 120900 | 1.64 |
| 9 C | 56500 | 90000 | 1.59 |
| 9 D | 52200 | 78600 | 1.51 |
| 9 E | 54200 | 75800 | 1.40 |

What is claimed is:

1. A process for preparing an oligomer, a cooligomer, a polymer or a copolymer (block or random) by free radical polymerization of at least one ethylenically unsaturated monomer or oligomer, which comprises (co)polymerizing the monomer or monomers/oligomers in the presence of a compound of formula (i)

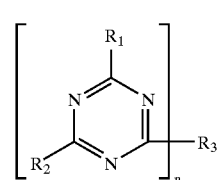

(I)

in which n is the number 1 or 2, and $R_1$ is a group of the formula

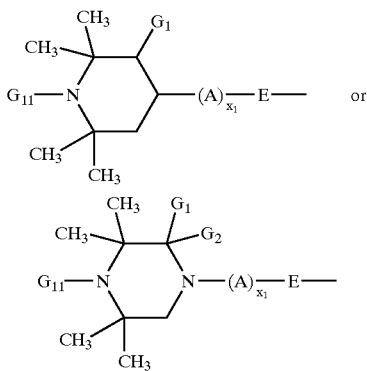

in which
G$_1$ and G$_2$ are hydrogen, methyl or, together, are a substituent =O,
E is —O— or —ND$_3$-,
A is C$_2$-C$_6$alkylene or —(CH$_2$)$_3$—O— and
x$_1$ is the number 0 or 1,
D$_3$ is hydrogen, C$_1$-C$_{12}$alkyl, C$_2$-C$_5$hydroxyalkyl or C$_5$-C$_7$cycloalkyl,
R$_2$ is identical to R$_1$ or is one of the groups —N(G$_{21}$)(G$_{22}$), —OG$_{23}$, —N(H)(CH$_2$OG$_{23}$) or —N(CH$_2$OG$_{23}$)$_2$,
R$_3$, if n=1, is identical to R$_1$ and,
if n=2, is an —E—D$_4$—E— group, in which D$_4$ is C$_2$-C$_8$alkylene or C$_2$-C$_8$alkylene which is interrupted by 1 or 2 —NG$_{21}$-groups,
G$_{21}$ is C$_1$-C$_{12}$alkyl, cyclohexyl, benzyl or C$_1$-C$_4$-hydroxyalkyl or a group of the formula

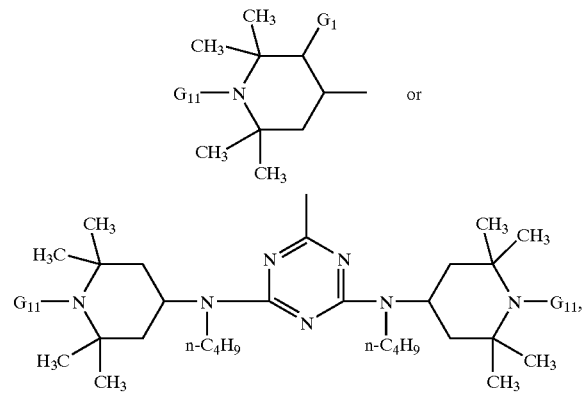

G$_{22}$ is C$_1$-C$_{12}$alkyl, cyclohexyl, benzyl or C$_1$-C$_4$hydroxyalkyl, and
G$_{23}$ is hydrogen, C$_1$-C$_{12}$alkyl or phenyl, or G$_{21}$ and G$_{22}$ together are C$_4$-C$_5$alkylene or C$_4$-C$_5$oxaalkylene, for example —CH$_2$CH$_2$—O—CH$_2$CH$_2$—, or a group of the formula —CH$_2$CH$_2$—N(G$_{11}$)—CH$_2$CH$_2$—;and, wherein
G$_{11}$ is —O—X
  a) under reaction conditions capable of effecting scission of the O—X bond to form two free radicals, the radical .X being capable of initiating polyermization; or
G$_{11}$ is O.
  b) additionally in the presence of a free radical source, liberating a free radical which is capable of initiating polymerization.

2. A process according to claim 1, wherein the scission of the O—X bond is effected by ultrasonic treatment, heating or exposure to electromagnetic radiation, ranging from γ to microwaves.

3. A process according to claim 1, wherein the scission of the O—X bond is effected by heating and takes place at a temperature of between 50° C. and 180° C.

4. A process according to claim 1, wherein the polymerization takes place at a temperature between 50 and 180° C.

5. A process for preparing an oligomer, a cooligomer, a polymer or a copolymer (block or random) by free radical polymerization of at least one ethylenically unsaturated monomer or oligomer, which comprises (co)polymerizing the monomer or monomers/ologimers in the presence of
  a) a compound having at least two

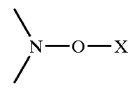

groups, under reaction conditions capable of effecting scission of the O—X bond to form two free radicals, the radicals .X being capable of initiating polymerization and the radicals

being stable free nitroxyl radicals or
  b) a compound having at least two stable free nitroxyl radicals

and additionally a free radical source is present; and
wherein after polymerization is completed at least one additional heating step at a temperature from 140° to 280° C. is applied.

6. A process according to claim 5, wherein the initiator/regulator compound is of formula (I)

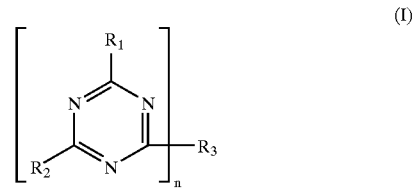

in which n is the number 1 or 2, and R$_1$ is a group of the formula

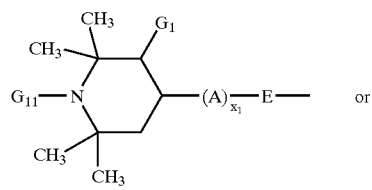

-continued

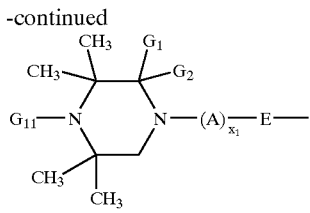

in which

G₁ and G₂ are hydrogen, methyl or, together, are a substituent =O,

E is —O— or —ND₃—,

A is $C_2$–$C_6$alkylene or —(CH₂)₃—O— and $x_1$ is the number 0 or 1, $D_3$ is hydrogen, $C_1$–$C_{12}$alkyl, $C_2$–$C_5$hydroxyalkyl or $C_5$–$C_7$cycloalkyl, $R_2$ is identical to $R_1$ or is one of the groups —N($G_{21}$)($G_{22}$), —O$G_{23}$, —N(H)(CH₂O$G_{23}$) or —N(CH₂O$G_{23}$)₂, $R_3$, if n=1, is identical to $R_1$ and, if n=2, is an —E—$D_4$—E— group, in which $D_4$ is $C_2$–$C_8$alkylene or $C_2$–$C_8$alkylene which is interrupted by 1 or 2 —N$G_{21}$-groups, $G_{21}$ is $C_1$–$C_{12}$alkyl, cyclohexyl, benzyl or $C_1$–$C_4$-hydroxyalkyl or a group of the formula

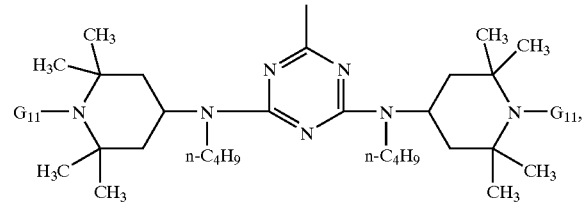

$G_{22}$ is $C_1$–$C_{12}$alkyl, cyclohexyl, benzyl or $C_1$–$C_4$hydroxyalkyl, and $G_{23}$ is hydrogen, $C_1$–$C_{12}$alkyl or phenyl, or $G_{21}$ and $G_{22}$ together are $C_4$–$C_5$alkylene or $C_4$–$C_5$oxaalkylene, for example —CH₂CH₂—O—CH₂CH₂—, or a group of the formula —CH₂CH₂—N($G_{11}$)—CH₂CH₂—;and $G_{11}$ is ). or —O—X, wherein X represents a group such that the free radical X. derived from X is capable of initiating polymerization of elthylenically unsaturated monomers; and if $G_{11}$ is O. a source of free radicals is additionall present.

7. A polymer or oligomer having attached at least one oxyamine group of formula (I), obtained by a process according to claim 1.

8. Use of a compound of formula (I) according to claim 1 for the polymerization of ethylenically unsaturated monomers or oligomers.

9. A process according to claim 1, wherein in formula (I) X is selected from the group consisting of —CH(aryl)₂, —CH₂—aryl, H₃C—CH(H)—aryl, —CH₂—CH₂—aryl, H₃C—C(CH₃)(H₃C)—aryl, ($C_5$–$C_6$cycloalkyl)₂CCN, ($C_1$–$C_{12}$alkyl)₂CCN, —CH₂CH=CH₂, ($C_1$–$C_{12}$)alkyl——$CR_{30}$—C(O)——($C_1$–$C_{12}$)alkyl, ($C_1$–$C_{12}$)alkyl——$CR_{30}$—C(O)——($C_6$–$C_{10}$)aryl, ($C_1$–$C_{12}$)alkyl——$CR_{30}$—C(O)——($C_1$–$C_{12}$)alkoxy, ($C_1$–$C_{12}$)alkyl——$CR_{30}$—C(O)——phenoxy, ($C_1$–$C_{12}$)alkyl——$CR_{30}$—C(O)——N——di($C_1$–$C_{12}$)alkyl, ($C_1$–$C_{12}$)alkyl——$CR_{30}$—CO——NH($C_1$–$C_{12}$)alkyl, ($C_1$–$C_{12}$)alkyl——$CR_{30}$—CO——NH₂,

—CH₂CH=CH—CH₃, —CH₂—C(CH₃)=CH₂,

—CH₂—CH=CH—phenyl, —CH₂—C≡CH,

—O—C(O)—$C_1$–$C_{12}$alkyl, —O—C(O)—$C_6$–$C_{10}$aryl, ($C_1$–$C_{12}$)alkyl——$CR_{30}$—CN,

[tetrahydronaphthalenyl structure] ,

[tetrahydropyranyl] or [tetrahydrofuranyl] , wherein $R_{30}$ is hydrogen or $C_1$–$C_{12}$alkyl;

the aryl groups are unsubstituted or substituted with $C_1$–$C_{12}$alkyl, halogen, $C_1$–$C_{12}$alkoxy, $C_1$–$C_{12}$alkylcarbonyl, glycidyloxy, OH, —COOH or —COO$C_1$–$C_{12}$alkyl.

10. A process according to claim 1, wherein in formula (I) X is selected from the group consisting of —CH₂-phenyl, CH₃CH-phenyl, (CH₃)₂C-phenyl, (CH₃)₂CCN, —CH₂CH=CH₂, CH₃CH—CH=CH₂ and O—C(O)-phenyl.

11. A process according to claim 1, wherein in formula (I) n is 1; $R_1$ and $R_3$ are a group of formula

[piperidine structure with $G_1$, $G_{11}$, (A)$_{x_1}$—E—, and CH₃ groups], $R_2$ is identical to $R_1$ and $R_3$, or is a group —N($G_{21}$)($G_{22}$), wherein $x_1$ is 0; $G_1$ is hydrogen; $G_{11}$ is O.; E is —ND₃; $D_3$ is $C_1$–$C_{12}$alkyl and $G_{21}$ and $G_{22}$ are independently $C_1$–$C_{12}$alkyl.

12. A process according to claim 1, wherein the ethylenically unsaturated monomer or oligomer is selected from the group consisting of alkene, styrene, substituted styrene, conjugated dienes, acrolein, vinyl acetate, (alkyl)acrylic acid anhydrides, (alkyl)arcylic acid salts, (alkyl)acrylic esters and (alkyl)acrylamides.

13. A process according to claim 12, wherein the ethylenically unsaturated monomer is ethylene, propylene, n-butylene, i-butylene, isoprene, 1,3-butaeiene, α-$C_5$–$C_{18}$alkene, styrene, α-methyl styrene, p-methyl styrene or a compound of formula $CH_2$=$C(R_a)$—(C=Z)—$R_b$, wherein $R_a$ is hydrogen or $C_1$–$C_4$alkyl, $R_b$ is $NH_2$, $O^{-(Me+)}$, glycidyl, unsubstituted $C_1$–$C_{18}$ alkoxy, $C_1$–$C_{18}$ alkoxy interrupted by at least one N and/or O atom, or hydroxy-substituted $C_1$–$C_{18}$alkoxy, $C_1$–$C_{18}$ alkoxy interrupted by at least one N and/or O atom, unsubstituted $C_1$–$C_{18}$alkylamino, di($C_1$–$C_{18}$alkyl)amino, hydroxy-substituted $C_1$–$C_{18}$alkylamino or hydroxy-substituted di($C_1$–$C_{18}$alkyl)amino, —O—$CH_2$—$CH_2N(CH_3)_2$ or —O—$CH_2$—$CH_2N^+H(CH_3)_2An^-$;

An⁻ is a anion of a monovalent organic or inorganic acid;

Me is a monovalent metal atom, and

Z is oxygen or sulfur.

14. A process according to claim 13, wherein $R_a$ is hydrogen, $R_b$ is $NH_2$, unsubstituted or hydroxy-substituted $C_1$–$C_4$alkoxy, unsubstituted $C_1$–$C_4$alkylamino, di($C_1$–$C_4$alkyl)amino, hydroxy-substituted $C_1$–$C_4$alkylamino or hydroxy-substituted di($C_1$–$C_4$alkyl) amino, and Z is oxygen.

15. A process according to claim 14, wherein the ethylenically unsaturated monomer is styrene, α-methyl styrene, p-methyl styrene or ethylene.

16. A process according to claim 1, wherein the compound of formula (I) is present in an amount of from 0.01 mol-% to 30 mol-%, based on the monomer or monomer mixture.

17. A process according to claim 13, wherein the source of a free radical initiator is a bis-axo compound, a peroxide or a hydroperoxide.

18. A process according to claim 1, wherein the radical source, generating the free radical initiator is present in an amount of 0.01 mol % to 30 mol %.

19. A process according to claim 1, wherein in formula (I); when $G_{11}$ is —O. the molar ratio of the free radical source to the compound of formulae I is from 1:2 to 20:1.

* * * * *